United States Patent Office 3,689,482
Patented Sept. 5, 1972

3,689,482
BASICALLY SUBSTITUTED URETHANE WITH LOCAL ANAESTHETIC ACTIVITY
Rolf Geiger, Frankfurt am Main, Wolfgang Konig, Langenhain, Taunus, and Walter Siedel, deceased, by Helene Elise Siedel nee Graf, heiress, Bad Soden, Taunus, and Roman Muschaweck, Frankfurt am Main, Germany, assignors to Farbwerke Hoechst Aktiengesellschaft vormals Meister Lucius & Bruning, Frankfurt am Main, Germany
No Drawing. Continuation-in-part of abandoned application Ser. No. 845,121, July 14, 1969. This application Dec. 9, 1970, Ser. No. 96,602
Claims priority, application Germany, July 25, 1968,
P 17 70 973.8
Int. Cl. C07d 29/30
U.S. Cl. 260—240 K     1 Claim

ABSTRACT OF THE DISCLOSURE 1-phenyl-propen(1)yl(3)-oxycarbonyl - 2' - piperidinoethylamide and its salts with physiologically tolerable acids having local anaesthetic activity.

---

This application is a continuation-in-part of co-pending application Ser. No. 845,121, filed July 14, 1969 by Geiger et al., now abandoned.

The present invention relates to the basically substituted urethane of the Formula I

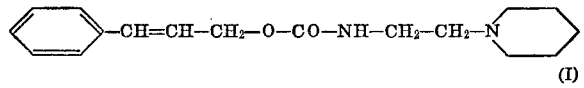

(I)

The above-specified compound is obtained by reacting reactive derivatives of the carbonic acid semi-ester of the Formula II

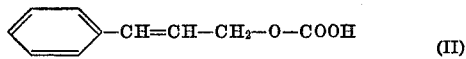

(II)

with 2-amino-ethyl-piperidine.

As reactive derivatives acid halides, especially chlorides or activated esters, for example a phenoxy or thienyl radical which may carry negative substituents, a N-hydroxysuccinimido or N-hydroxy-phthalimido radical may be used.

The starting substances are prepared in a manner known in the art from the corresponding alcohol and phosgene or a chloro-carbonic phenyl ester or a chloro-carbonic hydroxy-succinimide ester, if desired or required, in the presence of a tertiary base, for example triethylamine, N,N-dimethylaniline or pyridine.

The derivatives of the compound of the Formula II are reacted with the 2-amino-ethyl-piperidine advantageously at room temperature or at elevated temperature, for example at the boiling point of the solvent used, while adding a small excess of the compound of Formula II since, when the reaction is complete, this excess can be removed easier than the base.

As solvents there are mentioned all the organic solvents which do not react with the active compound of Formula II under the reaction conditions, or react substantially slower than 2-amino-ethyl-piperidine. Solvents of this type are, for example, dioxane, tetrahydrofurane, chloroform, benzene, toluene or acetate, moreover, in the case of activated esters, alcohols such as methyl, ethyl or isopropyl alcohol.

The isolation can be effected in various ways, advantageously by distilling off the solvent, taking up the residue in methanol and adding an alkaline agent in order to saponify a small excess of active ester. After neutralisation the mixture is evaporated. However, said saponification may not be necessary. The residue is combined with an aqueous alkaline solution and the free base of the reaction product is taken up in acetate, ether and chloroform. After washing with water the organic phase is dried and concentrated by evaporation. The base is converted, in methanol by the titration with hydrochloric acid or another suitable acid, into the corresponding salt which is recrystallised for purification. A preferred salt is the hydrochloride, but salts with other non-toxic acids are also possible. Suitable solvents for the crystallisation are, preferably, ethylacetate, dioxane or alcohols such as isopropanol, moreover mixtures of these solvents.

The new compound as local anaesthetic has the same strong action as, for example N-butylaminoacetic-acid-2-methyl-6-chloro-anilide (designated as compound A in Table 1) which is known to be a strong local anaesthetic compound (c.f. Arzneimittelforschung vol. 8 (1958), p. 273). In addition, the claimed compound possesses, advantageously, a good surface-anaesthetic component.

The new compound which shows no irritation is as well superior to other known local anaesthetics even to those compounds described by M. Häring, Arzneimittelforschung vol. 10 (1960), pp. 475 to 478 and M. Häring Helvetica Chimica Acta 43 (1960), pp. 104 to 113 having a comparable structure.

In Table 1 the values of the surface anaesthesia are related to that of a 0.1%-solution of 4'-butylaminobenzoyl-2-dimethyl-amino-ethanol (Pantocain®) designated as 100 while the other figures refer to the activity of a 1%-solution of N-butylaminoacetic acid-2-methyl-6-chloro-anilide (Hostacain®) fixed as 100. The compounds were administered in a 1%-solution.

The following compounds were compared:

(A) N-butylaminoacetic acid - 2 - methyl - 2 - chloroanilide (Hostacain®).

(B) N-diethylaminoacetic acid - 2,6 - dimethylanilide (Lidocain®, Xylocain®).

(C) 1-phenyl - ethyl(2)oxycarbonyl - 2' - piperidinoethylamide (Häring, Arzneimittelforschung vol. 10 (1960), p. 475, Table 1, compound IX).

(D) o-chlorobenzyloxycarbonyl - 2' - N - diethylaminoethylamide (Häring, Arzneimittelforschung vol. 10 (1960), p. 476, Table 3, compound XVIII).

(E) o,o - dimethyl - benzyloxycarbonyl - 2' - N - diethylamino-ethylamide (Häring, Helv. Chim. Acta 43 (1960), p. 106, Table 1, compound IV).

(F) 1-phenyl - propen(1)yl(3) - oxycarbonyl-2'-piperidinoethylamide (claimed compound of the present application).

TABLE 1

| Compound No.: | Surface anaesthesia | Infiltration anaesthesia | LD$_{50}$ | Irritation |
|---|---|---|---|---|
| A | 0 | 100 | 30–35 | −(+) |
| B | 0 | 75–80 | 50 | − |
| C | | 68–72 | 40 | ++ |
| D | | 95–100 | 35 | −(+) |
| E | | 100 | 27 | − |
| F | 100 | 100 | 35–40 | − |

The claimed compound F, especially in form of its salts, is highly water soluble (about 20–25%), its aqueous solution is stable, whereas the aqueous solutions of carbaminic acid-arylesters, known from Koelzer, Arzneimittelforschung vol. 8 (1958), pp. 708 to 716 (c.f. paragraph 3c), are instable and cannot be used practically for clinical purposes.

The basic compound can be converted by means of inorganic or organic acids into the corresponding salts. As inorganic acids there enter into consideration, for instance: hydrohalic acids such as hydrochloric acid and hydrobromic acid, furthermore sulfuric acid, phosphoric acid and amidosulfonic acid. As organic acids may be mentioned, for example: formic acid, acetic acid, propionic acid, lactic acid, maleic acid, succinic acid, tartaric acid, benzoic acid, salicylic acid, citric acid, aceturic acid, hydroxyethane-sulfonic acid and ethylene-diamine-tetra-acetic acid.

The claimed compound being used as strong local anaesthetic can be administered as such or in the form of corresponding salts in aqueous solutions by subcutaneous or intramuscular injections. The dosis of a single injection in human therapy is about 1 to 3 ml. of a 1–5% aqueous solution.

EXAMPLE 1-phenyl-propen(1)yl(3)-oxycarbonyl-2'-piperidino-ethylamide-hydrochloride (a) 20.1 g. of chlorocarbonic acid-p-nitrophenylester were added portionwise while stirring at 0° C. to a solution of 13.4 g. of cinnamic alcohol (0.1 mol) and 10 g. pyridine in 200 ml. of absolute ether. After the addition, stirring was continued for 3 hours at room temperature. Subsequently water and acetate were added thereto until dissolution was complete. The organic phase was shaken out with 1 N-hydrochloric acid, a sodium bicarbonate solution and water, dried by means of sodium sulfate and concentrated. The residue was triturated with petrol ether. Yield 24.3 g. (=81%) of 1-phenyl-propenyl(1,2)-p-nitrophenyl-carbonate.

After recrystallisation from alcohol the yield was 19.05 g. (=64%). Melting point 77° C.

(b) 7.5 g. of 2-amino-ethylpiperidine were added to a solution of 17.5 g. of 1-phenyl-propenyl-(1,2)-p-nitrophenyl-carbonate (0.0585 mol) in 70 ml. of acetate and the mixture was abandoned for 24 hours at room temperature. The solvent was distilled off in vacuo, the residue was taken up in methanol and 32 ml. of a 2 N-sodium hydroxide solution were added to the solution. The solution was abandoned for 1 hour at room temperature, then 32 ml. of 2 N-hydrochloric acid were added thereto and the methanol was distilled in vacuo. 32 ml. of a 2 N-sodium hydroxide solution were added to the aqueous phase and the whole was extracted with acetate. The acetate solution was dried by means of sodium sulfate and concentrated. The methanolic solution of the residue was neutralised by means of methanolic hydrochloric acid and then concentrated to a small volume. The hydrochloride was precipitated with ether.

Yield: 15.6 g. (=82%); Melting point 175–176° C.

We claim:

1. 1-phenyl-propen(1)yl(3)-oxycarbonyl - 2' - piperidino-ethylamide of the formula

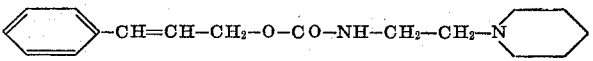

and its salts with physiologically tolerable acids.

References Cited

Häring, Helv. Chim. Acta 43, 104–13 (1960).
Häring, Arzneimittel-Forschung 10, 475–8 (1960).
Koelzer et al., Arzneimittel - Forschung 8, 708–16 (1958).

HENRY R. JILES, Primary Examiner
G. T. TODD, Assistant Examiner

U.S. Cl. X.R.

260—293.74; 424—267